March 24, 1970 K. BUTTER ET AL 3,501,916
TUBULAR COMPONENTS FOR FORMING A ROCKET
ENGINE COMBUSTION CHAMBER
Filed Sept. 20, 1967 3 Sheets-Sheet 1
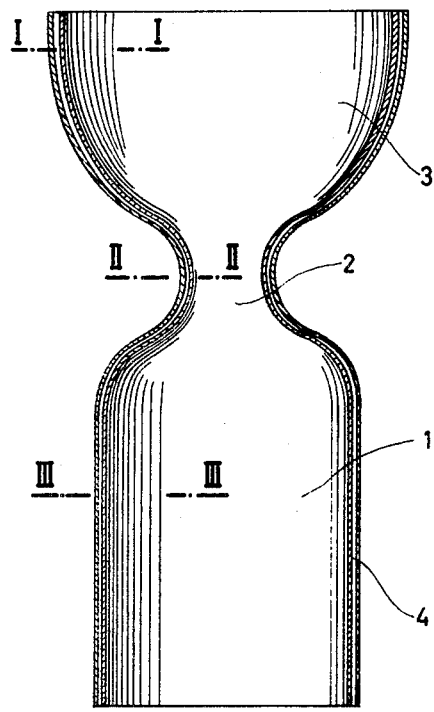
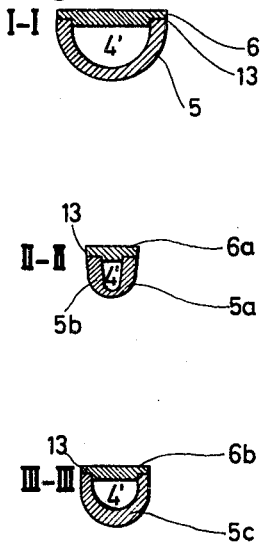
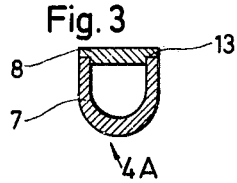
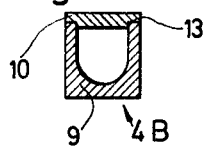
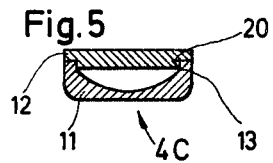
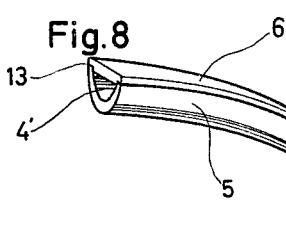
INVENTORS
Karl Butter
Carl Helmut Dederra
ATTORNEYS INVENTORS
Karl Butter
Carl Helmut Dederra By *Mueller and Toren*
ATTORNEYS United States Patent Office 3,501,916
Patented Mar. 24, 1970

3,501,916
TUBULAR COMPONENTS FOR FORMING A
ROCKET ENGINE COMBUSTION CHAMBER
Karl Butter and Carl Helmut Dederra, Munich, Germany, assignors to Bolkow Gesellschaft mit beschrankter Haftung, Ottobrunn by Munich, Germany
Filed Sept. 20, 1967, Ser. No. 669,168
Claims priority, application Germany, Sept. 24, 1966, B 89,084
Int. Cl. F02k 1/24; F02c 7/12; F28f 3/12
U.S. Cl. 60—267                                        8 Claims

ABSTRACT OF THE DISCLOSURE

A tubular component formed by a channel-shaped section and a closure section secured together to provide a closed fluid-tight passageway. The channel-shaped section of the tubular component is comprised of a web and a pair of spaced legs extending from the web. The tubular component is curved along its longitudinal axis and the thickness of the web and the spacing of the legs of the channel-shaped section vary along the length of the tubular component. Preferably, the sections forming the tubular component are formed of materials having different characteristics of heat conductivity and tensile strength, for example, the channel-shaped section could be formed of copper and the closure section of steel.

---

A rocket engine combustion chamber composed of a plurality of the above-described tubular components integrally secured together in an annular arrangement. The curved tubular components are symmetrically disposed about the longitudinal axis of the combustion chamber forming a cylindrically-shaped combustion section and exhaust section with a converging-diverging throat section between them. The width and web thickness dimensions of the channel-shaped section of the tubular components vary directly with the circumferential dimension of the combustion chamber.

A method of forming tubular components comprised of the steps of forming a first longitudinal strip of metal into a channel-shaped section having a web thickness of varying dimension and legs spaced at a varying distance along the length of the strip, forming a second strip of metal having a width comparable to the spacing between the legs of the first strip of metal, and securing the two strips of metal to form a closed fluid-tight passageway.

SUMMARY OF THE INVENTION

The present invention is directed to a tubular component and, more particularly, to the construction of a tubular component for use in forming the wall of a rocket engine combustion chamber. The tubular component is formed of a couple of longitudinally extending components secured together and having a varying cross sectional shape along the length of the component. When utilized to form the wall of a rocket engine combustion chamber, the shape of the tubular component varies in accordance with its position on the circumference of the combustion chamber.

The removal of heat from combustion chamber walls, and in particular, from the walls of high pressure rocket engine combustion chambers, is a problem which to date has not been satisfactorily solved. While it has been recognized that a fluid cooling system which circulates through all of the peripheral walls of a combustion chamber provides the best cooling results, to date, no way has been found to form the tubular components which make up the wall in a manner which is economical and, at the same time, so that the components function satisfactorily in cooling the various sections of the chamber and also afford a construction which can be easily assembled.

Within a rocket-engine combustion chamber, various pressures and temperatures exist in its combustion section, its nozzle throat and its exhaust section, and it is necessary to cool or remove the heat from these various sections to prevent overheating and the development of undue thermal stresses.

To date, numerous wall assemblies have been provided for the combustion chamber of a rocket engine and generally these have been composed of tubular components secured together in an annular or ring-like configuration. In one such arrangement, round tubular components are flattened at a particular section in their length to an oval shape corresponding to the narrow or throat section of the combustion chamber. The components are curved or pre-shaped to correspond to the curved wall configuration of the combustion chamber and secured together as segments of the combustion chamber and then interconnected in a tubular shape forming the combustion chamber. In addition, a jacket is arranged exteriorly about the tubular members, for a typical example see U.S. Patent No. 2,958,183.

This arrangement of tubular components has several problems, initially, the assembly of the components into the combustion chamber is uneconomical and complicated. When the tubular components are being secured to the inner wall of the jacket about the combustion chamber, the operation is extremely time consuming and difficult. Additionally, further complications are caused because the securing operation must be carried out in a vacuum. Still another problem encountered is the necessity of attaching gussets into the open angles or spaces between the inner wall of the jacket and the tubular components because the components are only in line contact with the jacket.

An improvement over the use of round tubular components has been achieved by forming the coolant channels from two U-shaped metal strips preformed, in the longitudinal direction, with the shape of the wall of the combustion chamber, and with the open portions of the strips facing each other. In forming the tubular components into a combustion chamber, a leg of each of the U-shaped strips is positioned on the inner face of the combustion chamber and the other leg on the outer face of the combustion chamber and the seam or joint between opposing U-shaped strips are positioned one behind the other in the radial direction so that each half of a tubular component forms a segment of the inner wall of the combustion chamber and also a segment of the outer wall of the combustion chamber, see U.S. Patent No. 2,976,679.

In this arrangement, the disposition of the tubular components facilitates the soldering or welding work during the assembly of the components into the combustion chamber because the joints between adjacent members are accessible from each side of the combustion chamber. However, the pressure tests to which each tubular component must be subjected prior to the final assembly of the combustion chamber is difficult to perform because the components are only secured together in liquid-tight form after the combustion chamber has been assembled. In this form, it becomes difficult to manipulate the combustion chamber to test the individual tubular components. Additionally, because each U-shaped strips forms a part of the inner and outer combustion chamber wall, only a single material can be employed for these tubes.

In a further development, the liquid cooled combustion chamber wall has been formed of separate cooling channels formed of a plurality of U-shaped metal channels secured to a circumferentially extending outer wall. In securing the U-shaped channels to the outer or jacket wall, the wall has cutouts into which matching tabs on the U-shaped metal channels are engaged. This engagement can be used as a temporary measure prior to the welding or soldering operation which integrally secures the various components together, see U.S. Patent No. 3,066,702. With the individual U-shaped channels secured to the inner face of the jacket, a plurality of individual tubular channels are formed having flow channels in the shape of the wall of the combustion chamber in its axial direction.

In this arrangement, the problem exists in securing the U-shaped members to the wall forming the combustion chamber jacket, this attachment operation is quite difficult because it must be performed from within the chamber. Accordingly, the formation of satisfactory joints in this arrangement is difficult and uneconomical, and this is particularly so since the operation must be carried out in a vacuum chamber.

In another method of constructing the coolant walls of rocket engine combustion chambers, fillers have been suggested which are welded between adjacent tubular components. The use of these fillers influences the wall thickness of the components and also contributes to forming a smooth surface on the inner combustion chamber wall, see Germany Patent No. 568,050. While it is possible using these fillers to vary the wall thicknesses of the tubular components, the fillers unnecessarily and disadvantageously increase the weight of the combustion chamber. Such an increase in weight reduces the efficiency of the rocket engine. If the purpose of the filler is to provide a smooth inner surface for the combustion chamber then its need is questionable since a smooth surface is not an essential quality for longitudinally elongated cylindrically shaped combustion chambers in which the cooling channels run in the longitudinal direction of the chamber. In such chambers, any welding beads which extend longitudinally along the inner surface do not, to any appreciable extent, influence the flow of gas through the combustion chamber.

Moreover, in view of German Patent No. 1,099,805, it is not novel to form the cooling channels of one component disposed at the inside of the combustion chamber and another component outer portion of the combustion facing the chamber jacket. While this arrangement has certain advantages from an assembly standpoint, it does not overcome the disadvantages which have been common to all of the other arrangements. With the wall thickness of the cooling channels uniform along the length of the combustion chamber it is necessary to maintain the temperature within the chamber at a particular level to prevent the cooling channels from burning out in the portions of the chamber which are most highly stressed thermally. However, with the temperature maintained at a low level for the portion of the chamber receiving the highest heat, the other sections of the chamber cannot be efficiently utilized even though the coolant channels are fully capable of removing greater temperatures that the ones to which they are exposed. In the past, tubular members of varying wall thickness along the longitudinal direction have been known, however, such members have been subdivided along their length into separate components joined together with threaded connections or the like, see U.S. Patent No. 1,310,130.

In view of the prior art, the present invention is directed to improving the heat transfer capability of coolant tubes and to relating this heat transferability directly to the various temperature zones in a rocket engine combustion chamber.

Accordingly, the present invention has as one of its primary objects to provide a tubular component for use as a cooling segment of a combustion chamber wall having a varying wall thickness along its length directly related to the varying temperatures within the combustion chamber.

Another object of the invention is to utilize a tubular component formed of two separate sections each preshaped in a configuration similar to that of the shape of the combustion chamber.

A further object of the present invention is to vary the wall thickness of the tubular component at the same time that it is given a curved configuration in its forming operation.

Still, another object of the invention is to utilize a tubular component formed of different materials having different characteristics of heat conductivity and tensile strength.

Moreover, another object of the present invention is to provide an assembled tubular component configuration which can be easily combined with similarly shaped components to form a combustion chamber wall.

Another object of the invention is to provide a configuration of the components forming the tubular member so that they are easily joined to form a fluid-tight passageway.

Still another object of the invention is to utilize the preformed tubular components to construct a rocket engine combustion chamber wall having a cylindrically shaped combustion section, joined to an exhaust section by a converging-diverging throat section.

A still further object of the invention is to utilize a circumferentially arranged wrapping about the tubular components to increase the strength of the rocket engine combustion chamber wall in the radial direction.

Yet, another object of the invention is to form the inner surfaces of the tubular components contacting the more highly heated portions of the combustion chamber with an uneven or roughened surface to agitate the flow of coolant fluid through the components and to increase its heat removal capability.

A further object of the invention is to afford a method of forming tubular components into the desired configuration for use as individual segments of a combustion chamber wall.

Another object of the invention is to provide a method of manufacturing tubular components which is specifically adapted to mass production methods avoiding unnecessary material usage and reducing the time required for forming the components.

Finally, it is an object of the invention to avoid the disadvantages inherent in the various cooling constructions used to date in rocket engine combustion chamber walls and to simplify the formation of individual tubular components into integrally secured segments of a combustion chamber wall.

Accordingly, the invention is directed to the formation of a tubular component comprised of two longitudinally extending sections each of a different material having different metallurgical properties, such as different heat conductivity and tensile strength characteristics. Further, the individual sections, or at least one of them, vary in thickness over the length of the component to provide the optimum heat removal from the different zones of the combustion chamber. The tubular components may be formed by various means such as chipless machining, stamping, forming, extruding, molding, bending, and similar operations.

As already indicated, the manner in which the tubular components are formed permits its section, which in position in the combustion chamber wall is in contact with the heated zones within combustion chamber, to be specifically adapted to remove the optimum amount of heat from the various zones of the chamber. By varying the wall thickness of the tubular components along the inner surface of the combustion chamber, it is possible to adapt the components to provide the various mathematically determined optimum cooling values required. Such a tubular component results not only in a weight saving for the rocket engine combustion chamber, but permits the temperature of the fuel gases to be increased, in turn, increasing the efficiency of the rocket engine.

The construction of the tubular components of two separate sections formed of different materials is particularly advantageous since it permits the section of the component located in a particular position relative to the interior of the combustion chamber to have a specifically desirable characteristic. For instance, the inner wall of the component, that is, the portion facing inwardly into the combustion chamber, is concerned with the removal of heat and accordingly a material having a good conductibility is desirable, and at the same time, for the outer surface of the component, which is directed outwardly away from the interior of the combustion chamber, it is preferable if it has a high tensile strength to withstand the various pressures which exist within the radially outward point of the combustion chamber wall.

As a specific example, a copper strip is utilized in manufacturing the section of the tubular components facing inwardly into the combustion chamber and a V2A steel strip is employed as the section of the tubular component facing outwardly from a combustion chamber. In such a component the steel will provide the high tensile strength required for the exterior of the tubular component while the copper will provide the desirable characteristic of high heat conductivity necessary in removing or transferring heat from the combustion chamber to the coolant flowing through the tubular component. In view of the different materials used, the wall thickness of the outer section of the tubular component can be formed of a thinner section for its entire length as compared to the section that might be required if the entire component were made of copper. Further, the wall thickness of the copper section can be varied along the longitudinal direction of the tubular component to provide a preferred cooling effect where it is desired based on the heat or temperatures existing within the combustion chamber. Though there is a difference in the coefficient of heat expansion between the two materials, it will not effect the strength of the wall. The coefficient of heat expansion for copper is $17 \times 10^{-6}$ and for V2A steel is $16 \times 10^{-6}$, and the difference between the two is so small that while it will appear as an internal stress within the structure of the tubular component, it will not be apparent externally. In a preferred embodiment of the invention, the tubular component is formed of a channel-shaped section made of copper or a material having a similar high heat transfer characteristic while the section of the tubular component facing outwardly from the combustion chamber is formed of a material such as V2A steel and has the shape of a flat strip.

In the past, the axial forces developed within the combustion chamber have required the use of special tension safety devices, such as anchors or the like, on the outside of the combustion chamber jacket. However, by using flat strips as the outer sections of the tubular components such devices are unnecessary, and reduction in weight is achieved which, in turn, provides an increase in the output of the rocket engine.

In the present invention, it is intended to provide the interior surface of the section of the tubular component exposed to the heat from the combustion chamber with an uneven or roughened effect in the regions where the heat removal requirements are the greatest, specifically in the area of the nozzle throat. In such regions where heat removal is critical, the ability of the tubular component to withstand the temperatures is enhanced by affording an inner surface configuration which will agitate the coolant passing through the tube and, in this manner, will afford a greater removal of heat.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 is a longitudinal sectional view of a rocket engine combustion chamber embodying the present invention;

FIG. 2 is an enlarged showing of three transverse cross sections taken at different positions along a cooling tubular component forming a wall segment of the combustion chamber illustrated in FIG. 2 and designated by the section lines I—I, II—II and III—III in FIG. 1;

FIGS. 3, 4 and 5 illustrate alternate embodiments of the cross sectional configuration of the tubular component illustrated in FIG. 2;

FIG. 8 is a perspective view of an assembled preformed tubular component for use as a segment of the combustion chamber wall shown in FIG. 1.

DETAILED DESCRIPTION OF THE PREFERRED EMBODIMENTS

Figure 6:
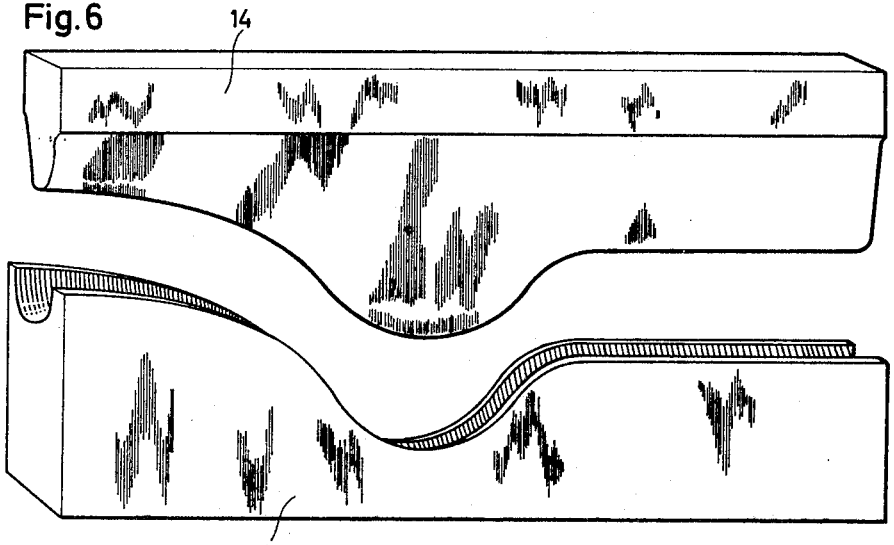
FIG. 6 displays a tool for forming a section of the tubular component shown in FIGS. 2–5.

In FIG. 1, a combustion chamber A is shown composed of a cylindrically-shaped combustion chamber section 1 a converging-diverging nozzle throat section 2 and an exhaust section 3. The wall forming the combustion chamber is constructed of a plurality of individual longitudinally extending tubular components 4. Each tubular component 4 forms a longitudinally extending passageway 4' along the periphery of the combustion chamber for the passage of a coolant fluid to remove heat from the combustion chamber. The tubular components 4 forming the wall of the combustion chamber A are all similarly constructed of a pair of shaped sections conforming to the shape of the combustion chamber wall.

In FIG. 2, three representative sections are shown of the tubular component 4 within each of the separate zones of the combustion chamber A. Each of the tubular components 4 is formed of an inner or channel-shaped section 5 and an outer or closure section 6. A principle feature of the invention is the adaptation of the wall thickness of channel-shaped section 5 to the temperature of the gases within the individual sections of the combustion chamber. By comparing the section I—I and III—III with that of II—II, it will be noted that the wall thickness of the web portion 5a of the channel-shaped section 5 is thinnest at the nozzle throat section 2 (II—II) and increases in thickness toward either end of the combustion chamber. In assembled position as individual segments of the combustion chamber wall, the channel-shaped sections 5 of the tubular components 4 have their web sections 5a contacting the gases flowing through the chamber and their legs 5b extending radially outward into contact with the closure section 6. In section II—II of FIG. 2, the wall thickness of the legs 5b is considerably greater than the thickness of the web 5a, while in section I—I, the wall thickness of the legs 5b and the web 5a is substantially the same, and in section III—III the web section 5c is somewhat greater than the wall thickness of the legs. It is the intent of the invention to vary the wall thickness of the tubular components, particularly the web section of the channel-shaped section 5, directly with the temperatures determined mathematically and by empirical tests for various locations along the length of the combustion chamber.

The closure member 6 of the tubular component 4, which in the assembled positions of the tubular component is located on the outside of the combustion chamber, is flat as viewed in the various sections in FIG. 2, and absorbs the various component forces active in the longitudinal direction of the chamber. Since the closure member is directed away from the heated zone of the combustion chamber it is not primarily concerned with heat transfer or removal but is more specifically concerned with providing the required tensile strength for the individual tubular components. A material selected on the basis of its high tensile strength as compared to its heat conductivity characteristic would be preferable for use in forming the closure section 6.

As can be noted in FIG. 2, the closure section 6 does not vary in thickness along its longitudinal direction because it is capable, based on its tensile strength, of withstanding the tension stresses developed even at its narrowest point of the tubular component since it is not exposed to the high thermal stresses acting on the inner section of the tubular component. These high thermal stresses are dissipated by the coolant fluid flowing through the passageway 4 before they have an opportunity to influence the closure section 6. Therefore, as shown in FIG. 2, the closure section 6 of section I—I, 6a of II—II and 6b of III—III are of a uniform thickness for the length of the tube though their width varies in accordance with the width of the channel-shaped section 5 of the tubular component. It can be noted that as the tubular component converges inwardly toward the longitudinal axis of the combustion chamber, the width of the closure section 6 is reduced and as it diverges away from the throat section 2 it again increases.

In FIGS. 3, 4 and 5, alternate embodiments of the transverse shape of the tubular component are indicated. These various shapes may be employed on the basis of the mathematically determinable optimum wall thickness values of view of the temperatures developed within the rocket engine combustion chamber. Moreover, in addition to accommodating the wall thickness of the other tubular component for the removal of heat from within the combustion chamber, they can also be employed for ease in integrally securing adjacent tubular components in the assembly of the combustion chamber wall. In FIG. 3, the tubular component 4A is formed of a rounded U-shaped channel section 7 and a flat closure section 8 generally similar to that shown in FIG. 2, but with the legs of the channel more elongated and spaced more closely together than that shown in FIG. 2 I—I. In FIGS. 4 and 5, the tubular components 4B, 4C have channel-shaped sections 9 and 11 whose exterior surface is rectilinear as compared to the rounded exterior surface of section 7 shown in FIG. 3. In both tubular components 4B and 4C the closure sections 10, 12, respectively, are formed of a flat strip and in each, the inner surface of the sections 9 and 11 have a curved configuration forming a channel-like passageway for the flow of coolant fluid. When the outside surfaces of the channel-shaped sections 9 and 11 of tubular components 4B and 4C respectively, are secured together to form the inside wall of the combustion chamber, the wall has a polygonal cross sectional appearance which has an essentially smooth surface as compared to the somewhat undulating surface achieved by the rounded shape of tubular components 4 and 4A. Among other factors, the velocity of the gas flow through the combustion chamber is influenced in the longitudinal direction by the shape of the nozzle throat 2 and not by the configuration of the inner surface of the channel-shaped sections of the tubular components.

The configuration of the tubular components shown in FIGS. 2 to 5 are given by way of example and, as can be appreciated, a number of configurations different from those illustrated could be employed to form the tubular components. However, in the components illustrated, a particularly expedient arrangement is shown for the connection of the channel-shaped section to the closure section. In each of the embodiments, the U-shaped or channel-shaped sections 5, 7, 9 and 11 is fitted into substantially right angled recesses along the opposite edges of the closure section 6, 8, 10 and 12. Due to this form of joint no offsets or shoulders are required which might interfere in the assembly of the tubular components or in the flow of coolant fluid through the components. In integrally securing the sections of the tubular component, as by a welding, soldering, or gluing operation, it is preferable if the channel-shaped section is applied to the closure section with a slight preload. Further, as an alternate arrangement, it is suggested that one of the surfaces of the closure member at its recess have a tapered or sloping disposition, as shown at surface 20 in FIG. 5. The joint between the two sections forming the tubular component is made fluid and pressure tight to guarantee the continuous troublefree passage of the coolant through the component. The sections comprising the tubular component can be joined together in a number of ways which will provide the pressure-tight and fluid-tight construction required.

In FIG. 6, a tool is shown for forming the channel-shaped sections 5, 7, 9, and 11 of the various embodiments of the tubular components. The tool comprises a punch member 14 which fits into a die member 15. The tool is provided with the transverse and longitudinal shape required to properly form the tubular component. A strip of metal is inserted into the die and the punch forms it into the desired shape. This tool forms the longitudinal configuration of the channel-shaped section 18 as shown in FIG. 9 and its variations in thickness.

The punch 14 and the die 15 can be pressed together in any suitable arrangement. This tool, of course, merely shows one manner of forming the channel-shaped section and other known metal-forming operations could be used to achieve the same results, such as by rollers with varying peripheral profiles, or by casting. The method of forming the individual sections comprising the tubular component is not considered to form the principal concept of the invention.

Figure 7:
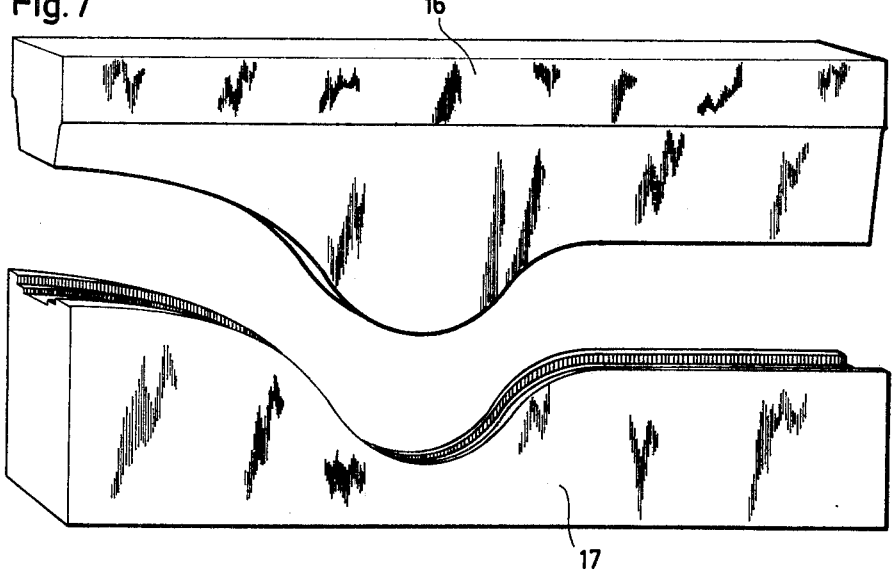
FIG. 7 is a tool for forming another section of the tubular component shown in FIGS. 2–5.

In FIG. 7 another tool is represented comprised of a punch 16 and die 17 for forming the closure section 6, 8, 10 and 12 of the tubular component. In FIG. 9 a typical closure section 19 is illustrated. The strip is given the desired longitudinal curvature comparable to the channel-shaped section formed by the tool illustrated in FIG. 6.

Figure 9:
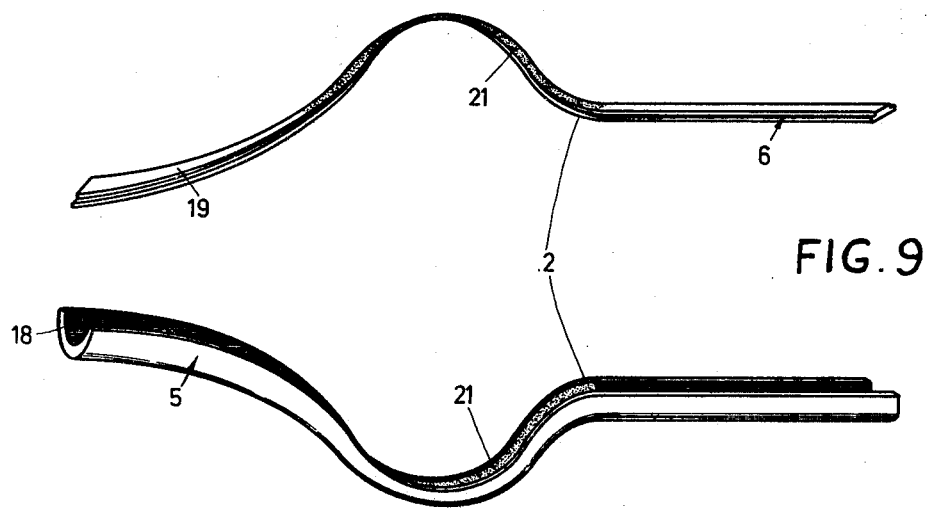
FIG. 9 is a perspective view of the two parts of the tubular component according to the present invention formed by the tools shown in FIGS. 6 and 7.

In FIG. 9 the interior surface of the channel-shaped section 18 and the closure section 19 are roughened, as by point engraving 21, at the location of the nozzle throat section 2 to agitate the flow of coolant fluid through the tubular components and to increase their heat removal capability.

In FIG. 8, an assembled tubular component 4 is shown comprised of the sections 5 and 6 with the abutting portions of each secured together at the joint 13 by any one of a number of integral securing methods such as, welding, soldering or gluing.

Since the tubular component is formed of two separate sections, it is a relatively simple matter to use different materials in each of the sections to provide the desirable characteristics of heat conductivity and tensile strength required by the position of the sections relative to their position in the combustion chamber wall. Similarly, the tubular components shown in FIGS. 3, 4 and 5 could be formed of different materials.

Figure 10:
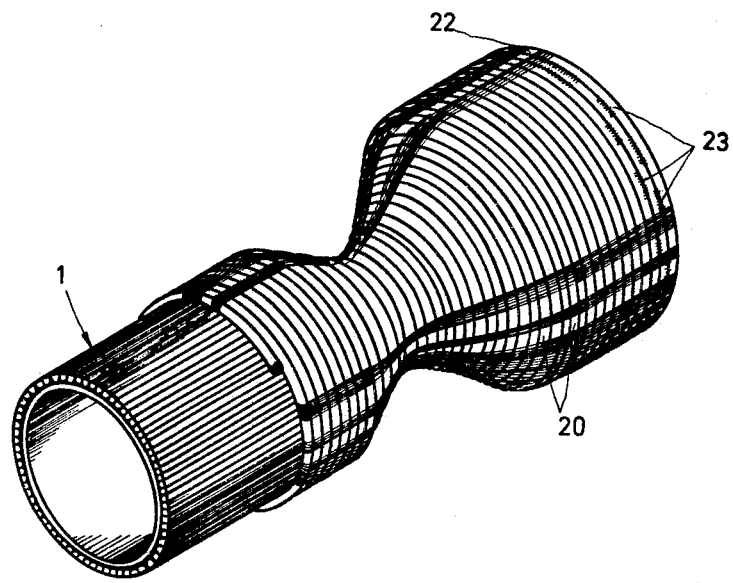
FIG. 10 is a perspective view of the combustion chamber of FIG. 1 showing a portion of the wrapping in place about the tubular components forming the chamber.

Because each tubular component forming the combustion chamber wall has the same shape and its individual sections are similarly formed and configured, the assembly of the tubular components is a relatively simple repetitive operation. Each tubular component is assembled as a unit prior to being attached to other components to form the combustion chamber and it is simple to check each component for pressure tightness and strength before securing it as a segment of the combustion chamber wall. After the tubular components are tested, they are arranged in a known fashion to form the wall of the combustion chamber and they are initially temporarily taped or secured together by tack welding. The next operation is to weld the adjacent faces in the circumferential direction at the upper and lower ends of the tubular component after which the temporary attachment means can be removed. Finally, without requiring any special or expensive welding means, the combustion chamber jacket seal can be completed by welding the tubular components in the longitudinal direction. Additionally, after completing the cooling wall of the combustion chamber, it can be provided with a wrapping in the circumferential direction using prestressed wires 20, see FIG. 10, to increase the margin of safety. The wire or strip material wrapped transversely around the chamber can be integrally joined together, as with welds 23, at intervals along the length of the wire 20 and at the ends 22 of the chamber. This wire wrapping 20 absorbs the various radial forces which are developed within the chamber, however, the attachment of adjoining tubular components provides the seal which is necessary for the combustion chamber.

While specific embodiments of the invention have been shown and described in detail to illustrate the application of the inventive principles, it will be understood that the invention may be embodied otherwise without departing from such principles.

What is claimed is:

1. A rocket engine combustion chamber, comprising a housing symmetrically disposed about its longitudinal axis and forming a combustion chamber section at one end of the longitudinal axis, an exhaust chamber section at the other end thereof and a converging-diverging throat section extending between the combustion chamber section and the exhaust chamber section, said housing comprising a plurality of individual longitudinally extending tubular components arranged in side-by-side relationship and adjacent said tubular components integrally secured together along their lengths forming a sealed fluid-tight inner surface for said housing, each of said tubular components having a similar configuration for forming the shape of the sections which make up the combustion chamber, each of said tubular components comprising a first longitudinally extending section and a second longitudinally extending section integrally secured together to form a fluid-tight flow passageway for the circulation of a coolant fluid therethrough, said first sections forming the inner surface of said housing and having a generally U-shaped transverse section, said second sections arranged out of contact with the interior of the combustion chamber, said first sections having a varying wall thickness along their length in accordance with the section of the combustion chamber in which it is located, said first section being formed of a material different from the material forming said second section, the material of said first section being selected on the basis of its heat conductivity characteristic and the material of said second section being selected on the basis of its high tensile strength, the interior surfaces of said first and second sections of said tubular components in the region of the throat section being roughened to agitate the flow of coolant fluid through said tubular component and to increase the heat removal capability in the region of the throat section.

2. A rocket engine combustion chamber, as set forth in claim 1, wherein said second section having a rectilinear transverse configuration.

3. A rocket engine combustion chamber, as set forth in claim 1, wherein a pre-stressed wire wrapped transversely around the exterior of said tubular components in contact with the outer surface of said second sections for absorbing radial forces within the combustion chamber, said wire being welded to the ends of said housing and the wires being welded together at intervals along their length about the combustion chamber.

4. A rocket engine combustion chamber, as set forth in claim 2, wherein said second section having a uniform thickness throughout its length.

5. A rocket engine combustion chamber, as set forth in claim 1, wherein said first section of said tubular component is formed of copper and said second section of said tubular component is formed of steel.

6. A rocket engine combustion chamber, as set forth in claim 1, wherein the width of said first sections of said tubular components having a variable width in direct correspondence with the circumference of the inner surface of said combustion chamber, and the thickness of the legs and of the bight portion of said first section being variable over the length of said first section in accordance with the location of said first section relative to the sections of the combustion chamber.

7. A rocket engine combustion chamber, as set forth in claim 1, wherein the outer surface of said first sections of said tubular components forming the interior surface of said combustion chamber having an arcuate convex configuration.

8. A rocket engine combustion chamber, as set forth in claim 1, wherein the outer surface of said first section of said tubular components forming the interior surface of said combustion chamber having a rectilinear shape whereby the section of the combustion chamber transverse to the longitudinal axis has a polygonal-shaped cross section.

References Cited

UNITED STATES PATENTS

| 1,310,130 | 7/1919  | Murray.   |         |
| --------- | ------- | --------- | ------- |
| 3,154,141 | 10/1964 | Huet      | 165—133 |
| 3,182,448 | 5/1965  | Rabe      | 60—260  |
| 3,190,070 | 6/1965  | Neu       | 60—267  |
| 3,235,947 | 2/1966  | Sohlemann | 29—157.3 |
| 3,254,487 | 6/1966  | Baehr     | 60—39.66 |
| 3,384,154 | 4/1968  | Milton    | 165—179 |

FOREIGN PATENTS

| 1,099,805 | 8/1961 | Germany. |
| 1,258,369 | 3/1961 | France.  |

MARK NEWMAN, Primary Examiner

D. HART, Assistant Examiner

U.S. Cl. X.R.

60—39.66; 29—157.3; 165—133, 179